United States Patent [19]
Tuai

[11] Patent Number: 5,153,918
[45] Date of Patent: Oct. 6, 1992

[54] SECURITY SYSTEM FOR DATA COMMUNICATIONS

[75] Inventor: Gregory Tuai, Seattle, Wash.
[73] Assignee: Vorec Corporation, Tarrytown, N.Y.
[21] Appl. No.: 615,380
[22] Filed: Nov. 19, 1990
[51] Int. Cl.[5] ............................................... H04K 1/00
[52] U.S. Cl. .......................................... 380/25; 380/23
[58] Field of Search ..................................... 380/25, 23

[56] References Cited

U.S. PATENT DOCUMENTS 4,949,379  8/1990  Cordell .................................. 380/23
4,998,279  3/1991  Weiss ..................................... 380/23

*Primary Examiner*—Thomas H. Tarcza
*Assistant Examiner*—David Cain
*Attorney, Agent, or Firm*—Francis C. Hand

[57] ABSTRACT

A modem security communication system for providing access to a computer system having a host computer and a central access controller located at a host location, and user terminals with transponders at a plurality of remote locations. The modem security communication system also includes at least one modem at each of the host and remote locations for interaction with the host computer and transponder, respectively. The transponder is arranged to receive a spoken word from a computer user whereby an analog signal is converted to a digital signal, compressed, encrypted, and transmitted to the host location where it is decrypted and compared with a stored signal on a voiced template corresponding to an identified user's voice. The system further provides for initial communication between the transponder and the host controller to sustain the communication link. This communication may also be encrypted for security. The system also provides for the voice templates to be updated with each authorized access to the computer system.

27 Claims, 3 Drawing Sheets

SECURITY SYSTEM FOR DATA COMMUNICATIONS

FIELD OF THE INVENTION

The present invention relates to a a security system for data communications. More particularly, this invention relates to a security system which provides for secure communication between a host computer and a plurality of user terminals incorporating speech recognition and encryption techniques.

BACKGROUND INFORMATION

In the prior art, communication between a centralized computer host location and one or more peripheral locations for example, via standard telephone lines, has been secured in a variety of techniques. For example, one technique which employs some measure of hardware or software lock-out or data encryption, typically calls for the assignment of code numbers or identification numbers to allow the host computer to determine whether access is being attempted by a legitimate user or other.

Personal identification numbers (PINs) have also been employed alone or in tandem with other code or identification sequences, some dependent (the output of one device of circuit may be a function of one or more inputted code numbers), some independent. However, in some cases, the use of PINs may not eliminate the problem of eavesdropping by an unauthorized entity. In these cases a misappropriation of an authorized access code by an unauthorized individual can occur.

It has also been known to use enciphering devices to camouflage transmissions while such are exposed to unsecured transmission lines as well as deciphering devices to prepare the intended communication for use by the receiving device.

The use of combinations of hardware and software to act as security devices has resulted in the evolution of passkeys, authorization cards (credit card type with magnetic strip) and the like. Further to this, limitations as to specific terminal usage by specific users have grown in an effort to secure computer systems. Generally, in many cases, the responses to this security issue have resulted in some measure of inconvenience to the user, in the form of carrying the correct card and/or memorizing a series of passwords and/or having access to a portable security box device.

Other types of security criteria, such as fingerprint matching, handwriting matching and voice verification have also been incorporated into the construction of communications systems. Fingerprinting and handwriting verification techniques, however, have difficulties with the matching process. Voice verification usually involves a comparison of fixed speech templates to an inputted voice pattern with possible secondary or tertiary analyses performed if the comparison yielded marginal differences in the patterns.

Speech recognition systems, as opposed to voice verification systems have been available in the market for some time. In its infancy, speech recognition technology was directed toward integrated circuit designs an example of which is the integrated circuit design of NEC known as the K3 chip set. Unfortunately for the speech recognition industry it was constructed to be very sensitive to variations in speech. This sensitivity is the key to its usefulness in voice verification systems. The K3 chip set is equipped with speech templates to hold a digital representation of at least one uttered word. This chip set is also designed to compare that digital representation to another digital signal which is loaded into the chip set from a separate storage medium.

Further to this, voice verification has, in the past, required significant input time to convert the voice pattern to a mode which could be easily transmitted over standard telephone lines, with the transmission of one word requiring as much time as 60 seconds to fully transmit at normal transmission rates. This is largely due to the required byte sequencing with such systems.

Accordingly, it is an object of the invention to eliminate a need for a separate passkey, card or other ancillary hardware security items to protect against unauthorized use of a computer system.

It is another object of the invention to maintain security of a host controller of a computer system in a simple manner.

It is another object of the invention to enhance security of a computer system during an access phase of communication and, optionally, during data transmission.

It is another object of the invention to use voice verification techniques to obtain a secure communication system between a host computer and a plurality of remote user terminals.

It is another object of this invention to reduce the transmission time required to transmit a digital sequence corresponding to at least one spoken word.

It is another object of this invention to provide a voice verification capability which can be updated with each allowed access to a computer system employing this voice verification security provision.

SUMMARY OF THE INVENTION

Briefly, the invention provides a security communication system for providing access to a computer system employing a host computer at a designated host location and a plurality of user terminals located at remote locations.

The security system includes a central access controller located at the host location and transponders each of which is located with a respective terminal.

The security system also includes a modem at each remote location to interact with the transponder thereat as well as a modem at the host computer location to interact with the host computer and the modems of the remote locations.

Each transponder includes a means for receiving an analog signal corresponding to at least one spoken word from a prospective user of the terminal, a means for converting the analog signal to a digital signal, a memory for storing a portion of the received analog signal, a signal compressor for receiving and reducing the digital signal to a control signal of a predetermined number of bytes and an encrypter/decrypter device for receiving and encrypting the control signal. The transponder is connected with the modem thereat in order to deliver the control signal thereto in encrypted form. The modem, in turn, is able to receive and transmit this encrypted control signal, for example, via telephone lines, cellular communications, microwave or other suitable transmission means, to the modem at the host location which is constructed to receive the encrypted control signals from all the modems of the remote locations.

The transponder may also include a reader for reading a magnetic strip of a magnetic strip card and emitting a verifying signal.

The central access controller receives an encrypted control signal corresponding to at least a portion of an orally generated speech pattern of a prospective user from a transponder disposed at least one of any number of remote locations. The central access controller includes an encrypter/decrypter device to decrypt the received encrypted signal. A voice verification unit is also included as part of the central access controller for comparing the compressed digital signal with a stored signal unique for each designated user of the system in order to permit access to the host computer system if the signals compared are indeed identical.

The controller also includes a template for storing one or more signals unique to one or more authorized users as well as the capability of updating these stored signals from time-to-time.

The security system uses a voice verification unit which allows for updates of speech templates found in the controller subsequent to each authorized access to the host computer by a designated user. System operator interface is not required for speech template updating as the process is automatic. As each inputted speech pattern is compared to existing patterns contained in the templates and found to match within preprogrammed tolerances, the inputted speech pattern is either substituted for the existing pattern on combined in a predetermined manner with the existing pattern to produce a new, updated template.

The present invention facilitates the use of voice verification as a security measure and allows for a faster communication of a consistent compressed signal which corresponds to an inputted voice pattern. The result is, of course, that more voice patterns can be required in a given timeframe thereby enhancing security. Likewise, the time requirement to transmit a voice pattern is reduced by digitizing and compressing the pattern before transmission.

These and other objects and advantages of the invention will become more apparent form the following detailed description taken in conjunction with the accompanying drawings wherein:

BRIEF DESCRIPTION OF THE DRAWINGS

Referring to FIG. 1, the security system is constructed for use with a computer system including a host computer 10 disposed at a host computer location and a plurality of user terminals 11 each of which is disposed at a remote location from the host computer 10. A modem 12 is also associated with the host computer 10 while a modem 13 is associated with each user terminal 11. A suitable transmission medium such as a telephone line 14 is used to facilitate the communication between the host computer 10 and the remote user terminals 11 through the respective modems 12, 13.

Figure 1:
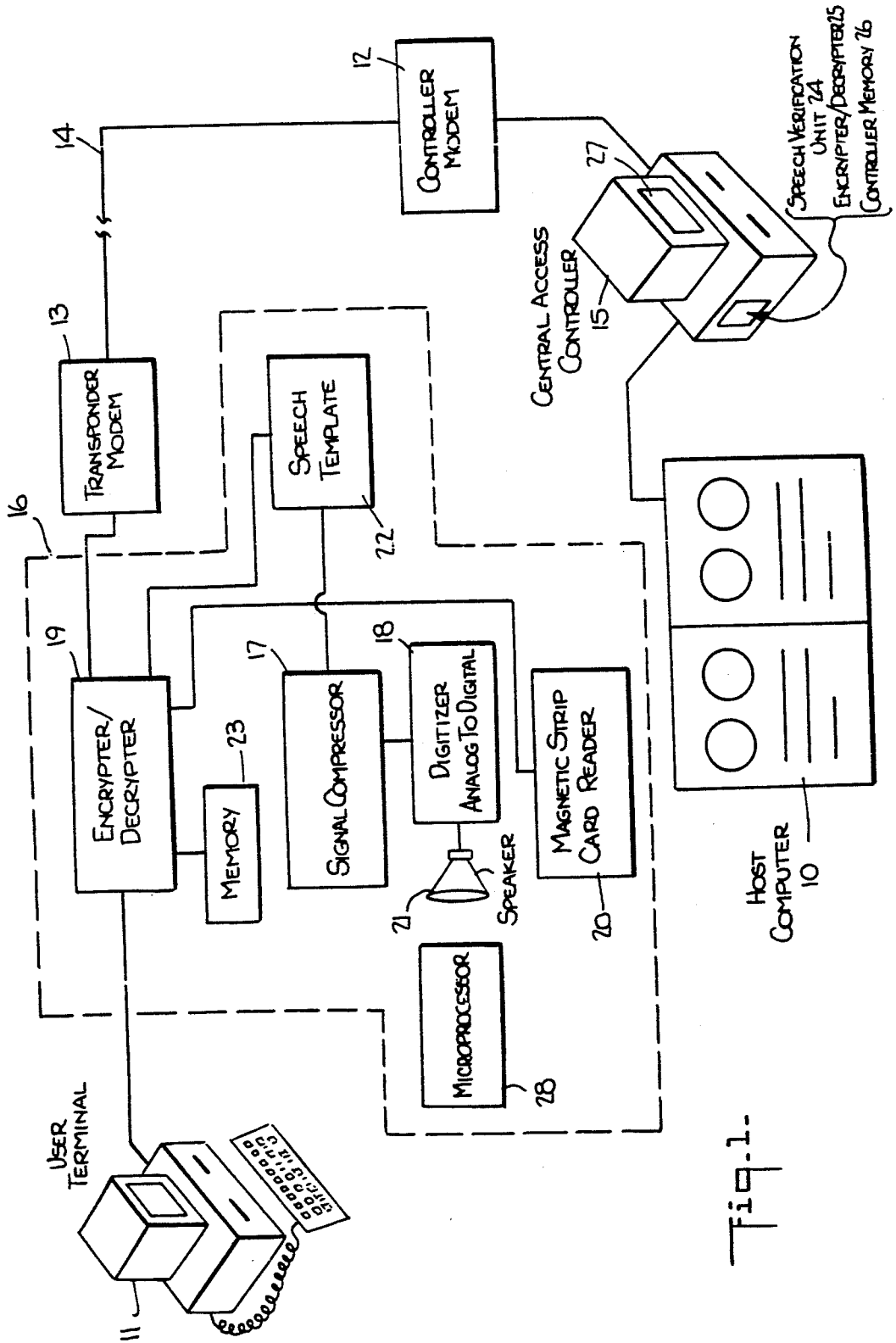
FIG. 1: Schematically illustrates a computer system having an access security system in accordance with the invention.
Figure 2:
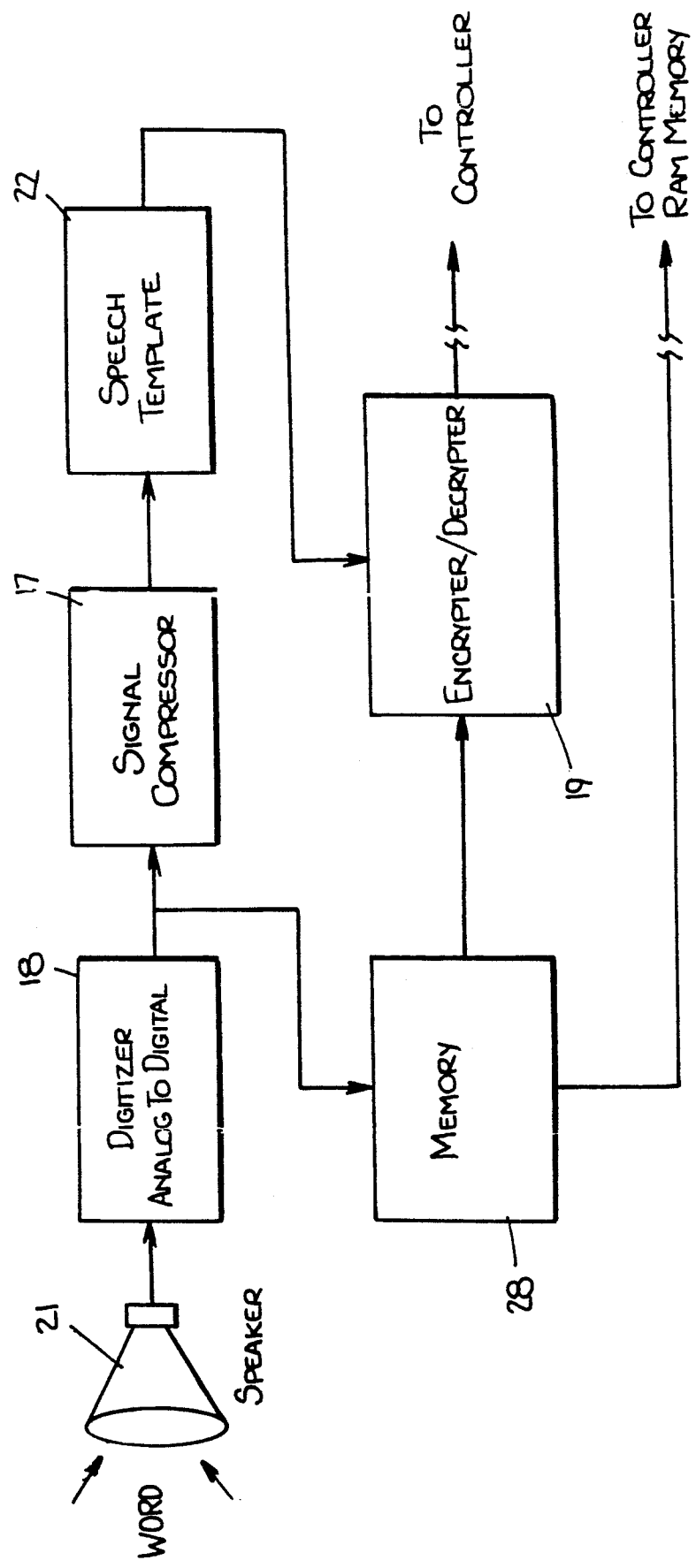
FIG. 2: Schematically illustrates a transponder constructed in accordance with the invention.
Figure 3:
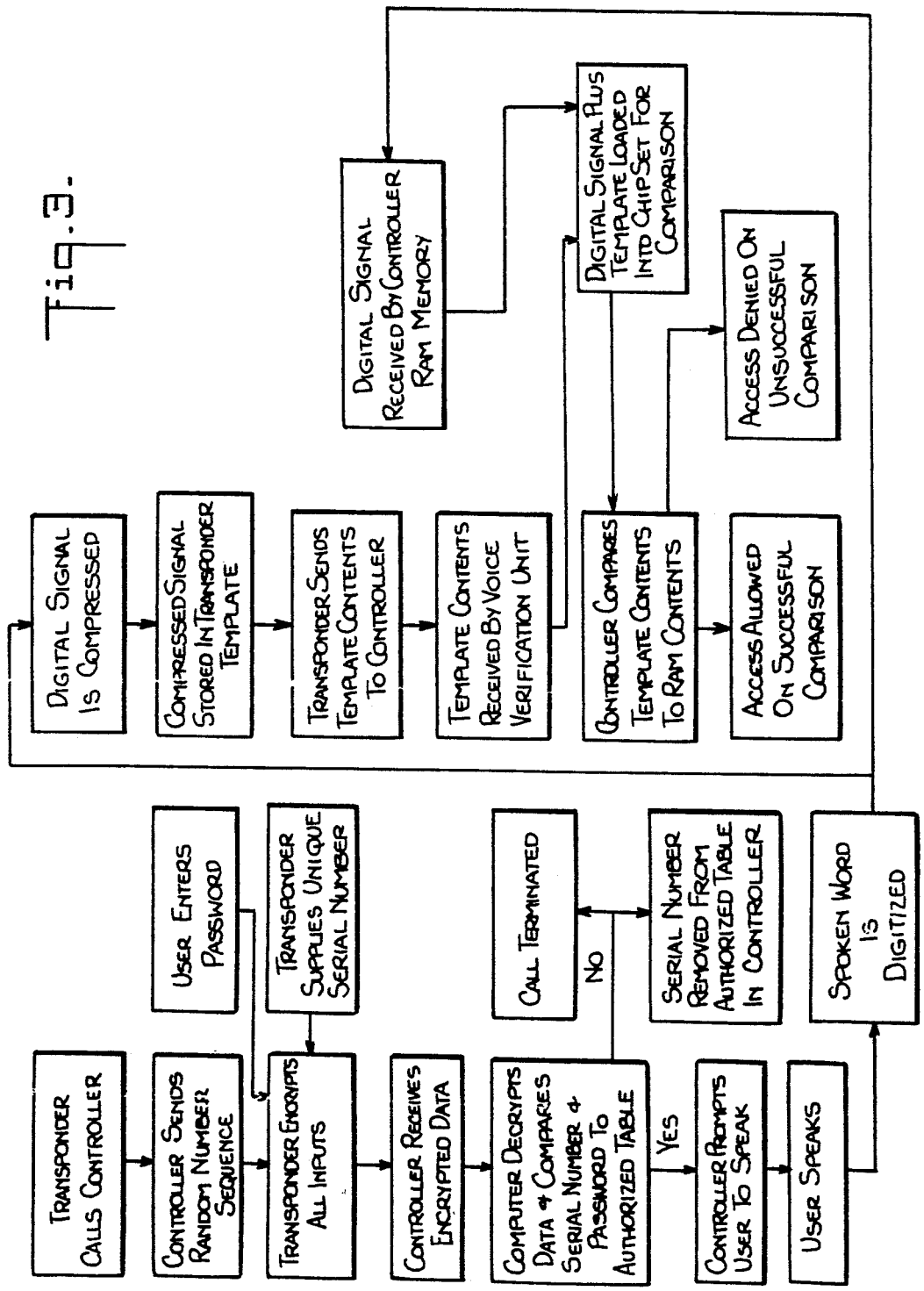
FIG. 3: Illustrates a flowchart for a security system communication sequence in accordance with the invention.

The security system which acts as a computer access control system is formed of a controller 15 at the host computer location and a transponder 16 at each remote user terminal location only one of which is shown. As indicated, the controller 15 is interconnected between the host computer 10 and the modem 12 thereat while each transponder 16 is interconnected between a user terminal 11 and the modem 13 thereat.

Each transponder 16 is constructed to receive the spoken word(s) of a prospective system user and to process the received words into a useful signal to gain access to the computer 10. To this end the transponder 16 performs a variety of functions, which can, for the sake of clarity, be segregated into seven sub-devices, although the transponder 16 may be physically a single device. The seven sub-devices can be labelled: memory device 23; two way speaker 21; signal compressor 17; encrypter/decrypter 19; digitizer 18; speech template 22; and optional magnetic strip card reader 20. Since the transponder 16 contains a preprogrammed microprocessor 28, the functions of the transponder 16 sub-devices are integrated and controlled by such program. For example, the transponder 16 can be programmed to require a designated user to repeat a predetermined word a specific number of times. Further to this, the transponder can be programmed to store any one, or all, of the repeated versions of the uttered predetermined words after the digitizer 18 but prior to the signal compressor 17.

Each transponder 16 is a physically small device which shall be located with the user terminal 11 and is of a microprocessor-based design. The transponder 16 is constructed with the memory device 23 to, for example, electronically store a unique serial number of the transponder 16 and the transponder uses standard RS-232 connections to the terminal 11 and modem 13. The enclosure for the transponder 16 is sealed and equipped with a means to detect tampering such that the contents of the memory device 23 within the transponder 16, will be erased or otherwise destroyed when tampering is detected. The memory device 23 also contains at least one digital signal corresponding to a spoken word of the prospective user taken immediately after the digitizer 18. The transponder 16 is programmed to send this signal to the controller 15 after access to the system has been allowed. In essence, the security system can then compare the last spoken word which resulted in access to the host computer 10 with the spoken word uttered to presently gain access to the host computer 10.

The two-way speaker 21 is a device which is used to receive the spoken word(s) of a designated user and to convert such spoken word(s) into an analog signal corresponding to the speech. This speaker 21 also serves to utter predetermined words in systems employing speech-prompting of designated users during access.

The signal compressor 17 is a logic circuit constructed to perform an algorithm which reduces the digital equivalent of each spoken word uttered into the two way speaker, to a predetermined number of bytes, which in turn requires approximately one second to transmit for example, over standard telephone lines.. This, in and of itself, is a major reduction in access time, allowing for more words to be used in voice verification and thereby enhancing security. The logic circuit can be comprised of portions of a K3 chip set as manufactured by NEC. The K3 chip set is a preferred integrated circuit arrangement to use in the signal compressor 17. The K3 chip set is capable of compressing an inputted digital signal to an 87 byte format, and also comparing such digital signal to an 87 byte signal. In normal operation a K3 chip set will be loaded with a speech template containing an 87 byte digital signal representative of at least one spoken word. This template would then be compared to an inputted digital signal which has not been compressed to the 87 byte signal format. The comparison would yield a signal to denote either recognition or non-recognition. When employed in the transponder 16 of this security system, the K3 chip set receives a digital signal from the digitizer 18 and compresses that signal to the 87 byte format prior to the transponder 16 transmitting the compressed signal to the controller 15.

The transponder's encrypter/decrypter 19 is a logic circuit constructed to take at least one signal input during initial access communications and encrypt such signal input in accordance with the National Bureau of Standards Data Encryption Standard (DES). During normal data communications, the use of the encrypter/decrypter device will be conditioned upon an activation signal from the central access controller 15. With such signal, all data sent from the user terminal 11 to the central access controller 15 and back will be encrypted.

The transponder digitizer 18 is an analog-to-digital converter, a device which converts analog signals to digital signals and is used specifically in this computer access security system to receive the analog signal corresponding to spoken word(s) of designated users. The analog-to-digital converter 18 may be a CODEC design with 12 bit accuracy, encoding 12 bits of data into 8 bits of data with negligible loss of voice data. As a side benefit from the use of the CODEC device, the transponder 16 is capable of speech playback as well as speech prompts to the user.

The magnetic strip card reader 20 is an optional device to enhance system security by requiring access to be a function of proper identification by way of possession of a designated user card bearing information required to access to the system by a specific designated user. Such use of a magnetic card reader 20 would be in addition to a voice verification unit.

The transponder 16 also houses at least one speech template 22 such that the compressed signal can be stored in the speech template 23 prior to being encrypted in the encrypter/decrypter device 19. The speech template 22 is an integral part of the transponder 16 and the entire modem security communication system as it contains the latest version of the compressed signal corresponding to at least one spoken word. This compressed signal is sent from the speech template 22 to the encrypter/decrypter 19 as soon as practicable after the spoken word is uttered. Such is then passed to the controller 15 for a comparison of the compressed signal with a previous digital signal stored in the controller 15. The comparison is performed in a speech verification unit 24 located in the controller 15.

Functionally, the transponder 16 exists to transmit the data used for identification to the central access controller 15. When voice verification is used, the transponder 16 will digitize an analog signal corresponding to a spoken work, compress that digitized signal to a predetermined byte sequence and transmit the compressed signal via the transponder modem 13 to the central access controller. 15 after passing through the encrypter/decrypter device 19.

The system is a "living" computer access security system in the sense that each successful access via voice verification results in the replacement of the stored digital signal found in the controller memory 26 for a designated user. The digital signal in this case corresponds to the utterance which allowed the last access for that user. Each attempted access results in the speech verification unit 24 receiving the latest version of the compressed signal corresponding to at least one spoken word. The controller memory 26 on the other hand receives the stored digital signal corresponding to the same spoken word but it receives this after access is allowed to the host computer. The effect of such an arrangement is to compare a prospective user's utterance with his own last utterance used to gain access to the system.

The digital signal which is received by the controller memory 26 is transmitted by the transponder 16 during periods of non-use of the data channel extending from the controller 15 to the transponder 16. This approach minimizes the inconvenience (due to lengthy transmission times) to the prospective user as such user is unaware of the digital signal transmission. The transponder 16 is programmed to transmit this digital signal only during such periods of non-use.

The implementation of a digital signal replacement, or update scheme as depicted above, is only one of a myriad of such implementations. For example, in lieu of replacing, in the controller memory, a digital signal corresponding to at least one spoken word, with a digital signal corresponding to at least one previously spoken word, this invention can be implemented to use an average value for two or more digital signals. Another implementation looks to a programmed scheme of statistical coefficients whereby each inputted digital signal in a predetermined number of inputted digital signals would be factored by a calculated coefficient corresponding to variables such as system usage and security clearance of the prospective user.

When other means of identification are used, such as a magnetic strip reader 20, the data from the strip shall also be transmitted to the controller 15.

The transponder 16 is initialized by the user terminal 11 to place the call, via the transponder modem 13, to the central access controller 15. When the call to the central access controller 15 is answered by the controller modem 12, the controller 15 polls the caller looking for the proper automatic response from the transponder 16. If the transponder 16 does not respond, the call is terminated by the controller 15. The response which is sought by the controller 15 is the unique transponder serial number which is authorized by the system operator and entered into the controller 15. Such serial number is encrypted for security. Once access is granted, the controller 15 commands the transponder 16 to request identification from the user. It is here that the user provides the proper keystrokes (ASCII input) and/or speech and/or other identification.

The central access controller 15 is the focal control mechanism for the system and this controller 15 acts as the arbiter of system access for the user. The function of the controller 15 is to receive all incoming calls and to verify voice, passwords or other identification means. The controller 15 consists of an IBM PC type computer or clone fitted with a number of RS-232 ports, a voice verification unit 24, encrypter/decrypter hardware 25, and controller memory 26. The RS-232 ports make the system connections standard.

The voice verification unit 24, located in the central access controller 15 is comprised of a logic circuit constructed to implement a word recognition algorithm. The logic circuit comprising the voice verification unit 24 can consist of the K3 chip set manufactured by NEC.

This is the preferred integrated circuit arrangement for the voice verification unit 24, and when used in this way, the K3 chip set receives two signals for comparison. One of these two signals is the compressed signal received from the transponder 16 and the other signal is the digital signal received from the controller memory 26.

The controller encrypter/decrypter 25 is comprised of a logic circuit which returns encrypted data to usable digital format by decrypting such encrypted data in accordance with the same DES scheme as employed in the transponder 16.

The central access controller 15 is located at the facility which houses the host computer 10 and shall be installed between the host computer 10 and the modem 12 which in turn, is situated before any telephone or terminal communications lines. When not being used for programming or access to the host computer 10, the controller 15 has a display 27 which is programmed to indicate the status of each of the communications lines of the controller 15. The status shows the length of time a user has been logged on, the time of log on, the number called (if programmed to use call back security), and other pertinent information so required.

The controller 15 may also have some memory capabilities to accommodate the fact that the voice data rate (for example, via telephone lines) can be less than the rate at which data is generated.

The controller 15 is programmed to store in a memory 26 contained therein, all valid transponder 16 unique serial numbers.

Prior to any access being granted to the controller 15, the transponder 16 must be able to return a particular data sequence to the controller 15 as a preliminary security measure. Upon initial contact the controller 15 sends particular data, which can be a random number sequence. The controller 15 stores that data while it also sends the same data to the transponder 16. The transponder 16 is programmed to receive this data and combine it, in a predetermined manner, with the unique transponder 16 serial number before encrypting the combined data. Once encrypted, the transponder 16 returns the encrypted data to the controller 15. The controller 15 is programmed to then decrypt the encrypted data before separating the unique serial number from the particular data in a predetermined manner. Once separated, the controller 15 proceeds to compare the particular data to the stored data. Similarly, the controller is programmed to compare the separated unique serial number with all valid transponder 16 serial numbers located in its memory 26. Only when both comparisons yield a match will access to the controller 15 be allowed. If either comparison yields a mismatch the communications link from the transponder 16 to the controller 15 is terminated by the controller 15. Also, in the event of a mismatch the controller 15 can erase a valid serial number from the controller memory 26 should it find that only the serial number comparison yields a match. Such a system is intended merely to frustrate computer hackers.

Functionally, the central access controller 15 has the ability to limit the length of incoming calls by a predetermined program. The central access controller 15 can also be programmed to accept one or multiple ASCII passwords from the transponder 16. Additionally, each authorized user has log and identification files maintained within the central access controller 15 as well as a history of established accesses to the host computer 10.

The capabilities of the central access controller 15 also include the optional call-back measure to enhance the security of the communication system. With this, the central access controller 15 can be equipped with a single incoming line and at least one outgoing line. The incoming line is used for answering calls from one or more transponders 16 and each outgoing line is used to call back the designated user after verification. The central access controller 15 is equipped to store pre-programmed telephone numbers for designated users, or to prompt the user to enter a telephone number to be used for a call back operation after verification. The latter situation results in the controller 15 recording the number which is to be called, in the user log.

As a further security enhancement, the central access controller 15 can be programmed to require additional identification of the user before allowing communications to take place with the host computer 10.

The central access controller 15 provides additional functionality through its capability to require all data communications, to and from the user terminal 11, to be encrypted. This is accomplished by the central access controller's 15 entry of an encryption key, which can only be set from the controller 15. Remote access is therefore prohibited. Fully encrypted data and limited access to the controller 15 encryption key enhance system security.

The system requires the user to transmit an ASCII password or key, known only to such user and to the central access controller 15. This key is used in the creation of the encrypted signal sent to the central access controller 15 for access to the system host computer 10. There should be no limitations as to specific terminal 11 usage by designated users, if such designated user is authorized for all terminals 11. Such authorization is contained in the central access controller 15.

The present invention can require a password or a key, or that the designated user speak when prompted to speak. Voice verification, as embodied in the present system, requires the user to speak from one to five words into a microphone or speaker 21 which is part of the transponder device 16. The security system can be programmed to require a prospective user to repeat the required words up to three times. The controller 15 prompts the user to speak without providing the user with the specific words to be uttered as an additional security measure. The more words uttered, the more secure the system. Of course, additional security measures such as a card (magnetic strip) reader 20 can be operated coincident with voice verification.

A host computer 10 is the device which is the ultimate target of access, and can be defined to include such peripheral equipment as disk and tape storage devices as well as other memory devices.

What is claimed is:

1. A security system for a computer system having a host computer and a plurality of user terminals, said system comprising a transponder for disposition at one user terminal location, said transponder including first means for receiving an analog signal corresponding to at least one spoken word from a prospective user of the terminal at said one remote location, second means for converting said analog signal to a digital signal, a memory device for storing at least a portion of said digital signal, a signal compressor for receiving and reducing said digital signal to a compressed signal of a predetermined number of bytes, at least one speech template for storing said compressed signal and an encrypter/decrypter for receiving and encrypting said compressed signal; and a controller for disposition at the computer for receiving an encrypted compressed signal from said transponder, said controller including an encrypter/decrypter for decrypting said encrypted compressed signal to a usable compressed signal, a controller memory for receiving and storing said portion of said digital signal and a voice verification unit for comparing said usable compressed signal with said stored portion of said digital signal and permitting access to said host computer in response to said stored portion of said digital signal being identical to said usable compressed signal.

2. A security system as in claim 1 wherein said transponder first means for receiving an analog signal comprises a speaker.

3. A security system as in claim 1 wherein said transponder second means for converting said analog signal to said digital signal comprises a digitizer.

4. A security system as in claim 1 wherein said controller is coupled to the host computer.

5. A security system as in claim 1 wherein said means for comparing said usable compressed signal with said stored portion of said digital signal includes a logic circuit comprising an NEC K3 chip set.

6. A security system as in claim 1 wherein said controller includes a controller memory for storing said stored portion of said digital signal and means connected to said controller memory for updating said stored signal.

7. A security system as in claim 3 wherein said digitizer is constructed with 12 bit accuracy to encode 12 bit digital signal sequences corresponding to at least one spoken word to 8 bit digital signal sequences.

8. A security system as in claim 6 wherein said means connected to said controller memory for updating said stored signal comprises said controller being programmed to input an updated stored portion of said digital signal into said voice verification unit.

9. A security system as set forth in claim 1 wherein said transponder includes a reader for reading a magnetic strip of a magnetic strip card and emitting a verifying signal to said controller.

10. A computer system comprising
a host computer at a host location;
a plurality of user terminals disposed at remote locations from said host computer;
a plurality of transponders, each transponder being connected with a respective user terminal at a respective remote location for receiving and processing spoken words into a signal to gain access to said host computer;
a plurality of modems, each modem being connected to a respective transponder at a respective remote location to receive and transmit said signal therefrom;
a modem at said host location for receiving said signals from said modems at said remote locations; and
a controller connected to and between said modem and said host computer at said host location for receiving and processing said signals to permit access to said host computer.

11. A transponder for a security system comprising
first means for receiving an analog signal corresponding to at least one spoken word from a prospective user of the terminal at said one remote location;
second means for converting said analog signal to a digital signal;
a memory device for storing said digital signal;
a signal compressor for receiving and reducing said digital signal to a compressed signal of a predetermined number of bytes; and
an encrypter/decrypter for receiving and encrypting said compressed signal.

12. A controller for a security system comprising
a decrypter for decrypting a received encrypted compressed signal corresponding to at least one spoken word from a prospective user of a host computer;
a controller memory for storing a digital signal; and
a speech verification unit for comparing said decrypted compressed signal with said stored digital signal and permitting access to the host computer in response to said decrypted compressed signal being comparable to said stored digital signal.

13. A signal compressor for a security system comprising
first means for receiving a digital signal corresponding to at least one spoken word from a designated user of a user terminal at one remote location;
second means for reducing said digital signal to a consistent compressed signal comprised of a predetermined number of bytes in a predetermined order; and
third means for passing said compressed signal to an encryption device.

14. A signal compressor as in claim 13 wherein said second means for reducing said digital signal includes a logic circuit comprising an NEC K3 chip set.

15. A method to secure communication between a host computer at a host location and at least one terminal at a remote location, said method comprising the steps of
generating a digital signal at said remote location corresponding to an orally generated speech pattern of a prospective user;
storing said digital signal in a first memory device;
compressing said signal to a compressed signal;
encrypting said compressed signal;
receiving said encrypted compressed signal at said host location;
decrypting said encrypted compressed signal at said host location to form a usable compressed signal;
comparing said usable compressed signal with said stored signal at said host location to permit access to the host computer in response to said usable compressed signal matching with said stored signal.

16. A method according to claim 15 further comprising the steps of
storing a unique transponder serial number in the first memory device;
sending a random number sequence from a controller to a transponder;
storing said random number sequence in a second memory device;
combining said random number sequence in a predetermined manner with said unique transponder serial number to form a combined data sequence;
encrypting said combined data sequence;
passing said encrypted combined data sequence to the controller;

decrypting said encrypted combined data sequence;

separating said combined data sequence in a predetermined manner to form a separated unique serial number and separated random number sequence;

comparing said separated unique serial number with said unique transponder serial number;

comparing said separated random number sequence with said random number sequence;

terminating communications between the transponder and the controller in response to said comparing of said separated unique serial number with said unique transponder serial number yielding a mismatch; and terminating communications between the transponder and the controller in response to said comparing of said separated random number sequence with said random number sequence yielding a mismatch.

17. A method according to claim 16 wherein the step of encrypting said combined data sequence further comprises the step of performing a predetermined encryption algorithm in accordance with the National Bureau of Standards Data Encryption Standard.

18. A method according to claim 16 wherein the step of decrypting said encrypted combined data sequence further comprises the step of performing a predetermined decryption algorithm in accordance with the National Bureau of Standards Data Encryption Standard.

19. A method according to claim 15 wherein generating said digital signal comprises the steps of receiving an analog signal which corresponds to at least one spoken word from a prospective user of the terminal disposed at a remote location; and converting said analog signal to said digital signal.

20. A method according to claim 19 wherein compressing said digital signal comprises the step of performing a predetermined compression algorithm contained in a K3 integrated circuit chip set.

21. A method according to claim 15 wherein comparing said usable compressed digital signal with said stored signal comprises the step of performing a predetermined comparison algorithm contained in a K3 integrated circuit chip 22. A method according to claim 15 further comprising the step of updating a second memory device located in the controller in response to each allowed access to the host computer.

23. A method according to claim 22 wherein the step of updating the second memory device further comprises the step of passing data contained in the first memory device located in the transponder, said data corresponding to at least one spoken word of a prospective user, to the second memory device located in the controller.

24. A method according to claim 22 wherein the step of updating the second memory device further comprises the steps of storing at least two said digital signals in the second memory device;

combining said stored digital signals in a predetermined manner; and using said combined signal to compare with said usable compressed signal.

25. A method according to claim 24 wherein the step of combining said stored digital signals further comprises averaging said stored digital signals to form said combined signal.

26. A method according to claim 25 wherein the step of combining said stored digital signals further comprises the step of assigning a calculated coefficient to each of said stored digital signals so that each of said stored digital signals is factored to a fixed percentage of its original value; and summing said factored signals to form said combined signal.

27. A method as set forth in claim 15 which further comprises the steps of subsequently encrypting all data communications between said terminal and said host location.

* * * * *